(12) United States Patent
Rohr et al.

(10) Patent No.: US 10,312,793 B2
(45) Date of Patent: Jun. 4, 2019

(54) CONTROL OF ELECTRICAL CONVERTER BASED ON OPTIMIZED PULSE PATTERNS

(71) Applicant: ABB Schweiz AG, Baden (CH)

(72) Inventors: Eduardo Rohr, Baden (CH); Peter Al-Hokayem, Baden-Daettwil (CH); Tobias Geyer, Ennetbaden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/865,426

(22) Filed: Jan. 9, 2018

(65) Prior Publication Data

US 2018/0131266 A1 May 10, 2018

Related U.S. Application Data

(63) Continuation of application No. PCT/EP2016/066291, filed on Jul. 8, 2016.

(30) Foreign Application Priority Data

Jul. 9, 2015 (EP) .................................... 15176085

(51) Int. Cl.
*H02M 7/217* (2006.01)
*H02M 1/12* (2006.01)
(Continued)

(52) U.S. Cl.
CPC .............. *H02M 1/12* (2013.01); *H02M 7/217* (2013.01); *H02M 7/53873* (2013.01); *H02M 2001/0012* (2013.01); *H02M 2001/0038* (2013.01)

(58) Field of Classification Search
CPC ................. H02M 7/219; H02M 7/217; H02M 2001/0082; H02M 2001/0012
See application file for complete search history.

(56) References Cited

U.S. PATENT DOCUMENTS 8,766,570 B2 7/2014 Geyer et al.
9,374,033 B2 6/2016 Oda et al.
(Continued)

FOREIGN PATENT DOCUMENTS

DE 102010002148 A1 8/2011
EP 0504449 A1 9/1992
(Continued)

OTHER PUBLICATIONS

European Patent Office, International Search Report & Written Opinion issued in corresponding Application No. PCT/EP2016/066291, dated Sep. 19, 2016, 12 pp.
(Continued)

*Primary Examiner* — Harry R Behm
(74) *Attorney, Agent, or Firm* — Taft Stettinius & Hollister LLP; J. Bruce Schelkopf (57) ABSTRACT

A method for operating an electrical converter including: determining an optimized pulse pattern from a fundamental voltage reference for the electrical converter, wherein the optimized pulse pattern is determined from a first lookup table and includes discrete voltage amplitude values changing at predefined switching instants; determining a harmonic content reference from the fundamental voltage reference based on a second lookup table, wherein the harmonic content reference is a harmonic current reference determined from the frequency spectrum of a current of the electrical converter or the harmonic content reference is a filtered voltage reference determined by applying a first order frequency filter to a voltage, which current or voltage is generated, when the optimized pulse pattern is applied to the electrical converter; determining a harmonic content error from the harmonic content reference by subtracting an estimated output voltage and/or estimated output current of the electrical converter from the harmonic content reference;
(Continued)

modifying the optimized pulse pattern by timeshifting switching instants such that the fundamental voltage reference is tracked and the harmonic content error is corrected by the timeshifted switching instants; applying the modified optimized pulse pattern to semiconductor switches of the electrical converter.

20 Claims, 4 Drawing Sheets

(51) Int. Cl.
*H02M 7/5387* (2007.01)
*H02M 1/00* (2006.01)

(56) References Cited

U.S. PATENT DOCUMENTS

| | | | | |
|---|---|---|---|---|
| 2008/0007974 | A1* | 1/2008 | Ponnaluri | H02M 1/12 363/20 |
| 2012/0150324 | A1 | 6/2012 | Brand et al. | |
| 2012/0161685 | A1* | 6/2012 | Geyer | H02M 1/12 318/503 |
| 2013/0128631 | A1 | 5/2013 | Yang et al. | |
| 2013/0163292 | A1 | 6/2013 | Basic et al. | |

FOREIGN PATENT DOCUMENTS

| | | |
|---|---|---|
| EP | 0521183 B1 | 3/1995 |
| EP | 0504449 B1 | 6/1995 |
| EP | 2469692 A1 | 6/2012 |
| EP | 2597763 A1 | 5/2013 |
| JP | 2006350900 A | 12/2006 |
| WO | 2009016113 A1 | 2/2009 |
| WO | 2012076838 A2 | 6/2012 |
| WO | 2013105427 A1 | 7/2013 |

OTHER PUBLICATIONS

European Patent Office, International Preliminary Report on Patentability issued in corresponding Application No. PCT/EP2016/066291, dated Oct. 20, 2017, 19 pp.
European Patent Office, Extended Search Report issued in corresponding Application No. 15176085.7, dated Jan. 29, 2016, 10 pp.
Laczynski, T. et al., Modulation Error Control for Medium Voltage Drives with LC-Filters and Synchronous Optimal Pulse Width Modulation, Industry Applications Society Annual Meeting, 2008, IEEE, Piscataway, New Jersey, Oct. 5, 2008, pp. 1-7.
Colak et al., "Review of multilevel voltage source inverter topologies and control schemes," Energy Conversion and Management, vol. 52, No. 2, Feb. 2011, pp. 1114-1128.
Geyer et al., "Model Predictive Direct Torque Control—Part I: Concept, Algorithm, and Analysis," IEEE Transactions on Industrial Electronics, vol. 56, No. 6, Jun. 2009, pp. 1894-1905.
Geyer et al., "Model Predictive Pulse Pattern Control," IEEE Transactions on Industry Applications, vol. 48, No. 2, Mar./Apr. 2012, pp. 663-676.
Jerez et al., "FPGA Implementation of an Interior Point Solver for Linear Model Predictive Control," 2010 International Conference on Field-Programmable Technology (FPT), pp. 316-319.
Linder et al., "Model-Based Predictive Control of Electric Drives," Cuvillier Verlag Göttingen, 2010, 271 pgs.
Richter et al., "Real-Time Input-Constrained MPC Using Fast Gradient Methods," Joint 48th IEEE Conference on Decision and Control and 25th Chinese Control Conference, Shanghai, China, Dec. 16-18, 2009, pp. 7387-7393.
Rodriguez et al., "Multilevel Inverters: A Survey of Topologies, Controls, and Applications," IEEE Transactions on Industrial Electronics, vol. 49, No. 4, Aug. 2002, pp. 724-738.
Buja et al., "Optimal Pulsewidth Modulation for Feeding AC Motors," IEEE Transactions on Industry Applications, vol. IA-13, No. 1, Jan./Feb. 1977, pp. 38-44.
Holtz et al., "Optimal Synchronous Pulsewidth Modulation with a Trajectory-Tracking Scheme for High-Dynamic Performance," IEEE Transactions on Industry Applications, Vo. 29, No. 6, Nov./Dec. 1993, pp. 1098-1105.
Holtz et al., "The Trajectory Tracking Approach—A New Method for Minimum Distortion Pwm in Dynamic High Power Drives," IEEE Transactions on Industry Applications, vol. 30, No. 4, Jul./Aug. 1994, pp. 1048-1057.
Holtz et al., "Fast Current Trajectory Tracking Control Based on Synchronous Optimal Pulsewidth Modulation," IEEE Transactions on Industry Applications, vol. 31, No. 5, Sep./Oct. 1995, pp. 1110-1120.
Patel et al., "Generalized Techniques of Harmonic Elimination and Voltage Control in Thyristor Inverters: Part I—Harmonic Elimination," IEEE Transactions on Industry Applications, vol. Ia-9, No. 3, May/Jun. 1973, pp. 310-317.
Patel et al., "Generalized Techniques of Harmonic Elimination and Voltage Control in Thyristor Inverters: Part II—Voltage Control Techniques," IEEE Transactions on Industry Applications, vol. IA-10, No. 5, Sep./Oct. 1974, pp. 666-672.
Rodriguez et al "Predictive Control of Power Converters and Electrical Drives," John Wiley & Sons, Inc., 2012, Abstract and Table of Contents provided. 10 pages.
Scheuer, "Investigation of the 3-level voltage source inverter (VSI) for flexible AC-Transmission systems (FACTS) exemplified on a static var compensator (SVC)," Ph.D. Thesis, Eth Zurich, 1997, 412 pp.

* cited by examiner

CONTROL OF ELECTRICAL CONVERTER BASED ON OPTIMIZED PULSE PATTERNS

FIELD OF THE INVENTION

The invention relates to the field of control of high power converters. In particular, the invention relates to a method and controller for operating an electrical converter based on optimized pulse patterns. Furthermore, the invention relates to a converter system controlled by such a method and/or controller.

BACKGROUND OF THE INVENTION

High power electrical converters are used for converting voltages of different amplitudes and frequencies (such as AC and DC voltages) into one another. In such converters, semiconductor switches are switched according to specific patterns determined by a controller to achieve the voltage conversion.

One possibility to control such a converter are precomputed optimized pulse patterns (OPP), which may be used to shape the spectrum of the currents and voltages of the converter. Traditional OPP-based methods rely on an external control loop to provide a modulation index reference that is used to read offline computed switching angles. These switching angles are then directly applied to the semiconductor switches.

Such a method may have several drawbacks. For example, the dynamic performance may be poor because of the slow modulation index control loop. Also, the OPP angles may have to change slowly when changing the modulation index, i.e., almost continuous. The necessity for smooth OPP angles greatly limits the achievable current and voltage spectrums over the operating range.

Therefore, in EP 2 469 692 A1, optimized pulse patterns are modified based on model predictive control. Pre-computed OPP switching angles are modified online in order to follow a flux trajectory. This model predictive control method may solve the two issues mentioned above and may be well suited for machine-side applications.

However, for grid side applications, it may be preferable to directly control the current. In a flux-based method for the grid side, the current reference may have to be transformed into a voltage reference and then integrated over time to generate a flux reference. In such a way, generating the voltage reference may require good knowledge of the grid voltage and impedance, as well as parameters of a transformer interconnected between the grid and the converter.

Another issue with flux-based control on the grid side may be that generating a flux reference by integrating the voltage reference can cause long lasting off-centered flux trajectories when sudden changes in the voltage amplitude occur. This is the case for grid voltage dips, for instance.

EP 0 504 449 A1 relates to a control method for an electrical converter, in which OPPs are modified based on a voltage reference.

Lacynsky T. et al, "Modulation Error Control for Medium Voltage Drives with LC-Filters and Synchronous Optimal Pulse Width Modulation, INDUSTRY APPLICATIONS SOCIETY ANNUAL MEETING, 2008. IAS '08. IEEE, IEEE, PISCATAWAY, N.J., USA, Oct. 5, 2008 refers to a simulation and describes that precalculated optimized pulse patterns may be optimized by eliminating undesired harmonics (chapter "Definition and Calculation of Modulation Error" on page 3). A modulation error may be corrected, either based on an analytical solution of the optimization problem (chapter "Modulation Error Control by the LQR Controller" on page 4) or directly by minimizing an energy function (chapter "Modulation Error control by the Ljapunow Controller" on page 4).

DESCRIPTION OF THE INVENTION

It is an object of the invention to provide a simple, fast and reliable control method for an electrical converter. It is a further object of the invention to provide a control method that is especially suited for a grid side controller.

These objectives are achieved by the subject-matter of the independent claims. Further exemplary embodiments are evident from the dependent claims and the following description.

An aspect of the invention relates to a method for operating an electrical converter. The method may be implemented in hardware and/or software in a controller.

According to an embodiment of the invention, the method comprises: determining an optimized pulse pattern from a fundamental voltage reference for the electrical converter, wherein the optimized pulse pattern is determined from a first lookup table and comprises discrete voltage amplitude values changing at predefined switching instants; determining a harmonic content reference from the fundamental voltage reference based on a second lookup table, wherein the harmonic content reference is a harmonic current reference determined from the frequency spectrum of a current of the electrical converter or the harmonic content reference is a filtered voltage reference determined by applying a first order frequency filter to a voltage, which current or voltage is generated, when the optimized pulse pattern is applied to the electrical converter; determining a harmonic content error from the harmonic content reference by subtracting an estimated and/or filtered output voltage and/or estimated output current of the electrical converter from the harmonic content reference; modifying the optimized pulse pattern by timeshifting switching instants such that the fundamental voltage reference and/or a current reference (from which the fundamental voltage reference may be determined) is tracked and the harmonic content error is corrected by the timeshifted switching instants; and applying the modified optimized pulse pattern to semiconductor switches of the electrical converter.

The method is based on two lookup tables.

In a first lookup table, optimized pulse patterns are stored. These optimized pulse patterns (which may be seen as reference voltage patterns) may have been computed offline. Based on a fundamental voltage reference, which, for example may be provided as a voltage magnitude and a frequency, one voltage reference pattern is selected.

In a second lookup table, harmonic content references are stored. These harmonic content references model the behaviour of the electrical converter, when a specific optimized pulse pattern is applied to the converter. Also, the harmonic content references may have been computed offline. For example, a model of the converter may have been used to calculate the harmonic content references for the specific optimized pulse patterns.

In such a way, it is not necessary to online evaluate a model of the converter to determine the harmonic content of specific quantities (such as output/input voltages/currents) in the converter.

A harmonic content reference may be stored in the lookup table as timepoint/value-pairs in the lookup table. Intermediate points of a trajectory of the harmonic content reference may be determined from this timepoint/value-pairs by interpolation.

From the harmonic content reference, a harmonic content error is determined by comparing the harmonic content reference with an estimated output value of the converter such as an estimated and/or filtered output voltage and/or current. The estimated output value may be directly or indirectly calculated from measurements in the electrical system.

It has to be noted that the harmonic content reference and/or the harmonic content error may be discrete time trajectories, i.e. may be provided as values at discrete time points.

Furthermore, these two quantities may be provided up to a prediction horizon, which for example, may be a specific number of time instants in the future.

Furthermore, a harmonic content reference may refer to a fundamental frequency and to frequencies of higher order harmonics of a voltage signal determined from the optimized pulse pattern. It also may be possible that the fundamental frequency is not part of the harmonic content reference. In general, harmonic content in this context may refer to a signal that may be achieved by the converter. The fundamental component of the signal may be provided by the required fundamental voltage/current reference, and the remaining components (and/or harmonics) may be determined based on the optimized pulse pattern.

Then, the harmonic content error is used to modify the voltage reference pattern in such a way, that the harmonic content error is corrected. In other words, the voltage reference pattern is modified such that the error of the fundamental component of the filtered voltage and/or current controlled is minimized and the real harmonic content generated by the converter is shaped according to the optimized pulse pattern. The voltage reference pattern is modified in such a way, that time instants indicating, when the output voltage has to be switched to another level, are moved in time.

With the method, it may be ensured that the converter operates safely and reliably by maintaining a set of variables within given bounds, that it closely follows arbitrary electrical references, which relate to the active and reactive power, and that it produces a deterministic voltage and current spectrum according to pre-computed voltage reference patterns. Furthermore, such a method may be simple installed and commissioned. I.e. only less work is necessary to customize the method or a corresponding controller to a specific electrical system.

According to an embodiment of the invention, the harmonic content error is corrected by minimizing a cost function, which comprises a term quadratic in the harmonic content error and a term quadratic in timeshifts of the switching instants. The harmonic content error, which also depends indirectly on the estimated values from the timeshifts, may be minimized together with a term that penalizes timeshifts which are getting too large.

According to an embodiment of the invention, the timeshifts are applied in a time window ending at a prediction horizon. To minimize the harmonic content error, the controller may only modify to timeshifts up to a predefined prediction horizon. The cost function may be based on the harmonic content error at the end of the prediction horizon, i.e. may be evaluated at the end of the prediction horizon.

According to an embodiment of the invention, the cost function is minimized subject to the constraint that an order of switching instants does not change. The voltage reference patterns (optimized pulse patterns) may have been optimized with respect to other objectives, such as losses. To maintain these properties of the voltage reference patterns, it may be beneficial also to maintain the order of the switching instants. The voltage reference patterns should not lose its general form after modification.

According to an embodiment of the invention, the cost function is minimized by solving a quadratic programming. This quadratic program may be solved online in the controller. It also is possible to solve this quadratic programming online analytically and to implement the resulting equations in the controller. With these equations, the timeshifts may be calculated based on the optimized pulse patterns and the harmonic content error.

According to an embodiment of the invention, the method further comprises: determining the fundamental voltage reference from a fundamental current reference (for example provided by an outer control loop) and an estimated grid voltage. With the method, it is possible to directly control an electrical current of the electrical converter. This may be beneficial for an active rectifier, which is usually controlled via the grid current and not via a flux.

According to the invention, the harmonic content reference is a harmonic current reference determined from the frequency spectrum of a current of the converter, which is generated, when the voltage reference pattern is applied to the converter. For example, the converter may be simulated offline and the current generated, when a specific voltage reference pattern is applied, may be calculated. From this current, the frequency spectrum may be determined (for example by discrete Fourier transform). The higher order contributions (without the fundamental frequency component) of the current may be saved in the second lookup table indexed by the fundamental component. The higher order contributions may be seen as a ripple on the fundamental component.

Online, i.e. during the operation of the converter, the higher order contributions may be read from the second lookup table and added to the fundamental current reference. The error may then be determined by subtracting an estimated current, for example determined from measurements.

Summarized, an optimal current trajectory (as harmonic content reference) may be computed online by adding two components: the fundamental component (as current reference) and the ripple or harmonic components. The fundamental component may be provided by some external loop, e.g., the DC link voltage control loop. The ripple component may be provided by the second lookup table and by the grid impedance. The difference between the actual, estimated current and the optimal current trajectory may then be used to correct the switching instants of the optimized pulse patterns. Note that in this case there is no need to have an external controller in the current loop. This may simplify the commissioning work, may increase the robustness of the solution, and may increase the controller bandwidth.

Furthermore, in such a way, the control method may directly regulate an electrical current along an optimal trajectory (instead of a flux trajectory).

Also note that the fundamental and harmonic content in the current may be treated as a single quantity. This may simplify the implementation, since no special filters and procedures to separate fundamental and harmonic content are required.

According to the invention, the harmonic content reference is a filtered voltage reference determined by applying a first order frequency filter to a voltage which is generated, when the optimized pulse pattern is applied to the converter. It also is possible to base the harmonic content analysis on the converter voltage.

For example, the converter may be simulated offline and the voltage generated, when a specific voltage reference pattern is applied, may be calculated. This voltage then may be filtered with a first order frequency filter to extract the harmonic content of the voltage. The filtered voltage then may be stored in the second lookup table.

According to an embodiment of the invention, the harmonic content error is the difference of the filtered voltage reference and an estimated filtered voltage, wherein the estimated filter voltage is determined by online applying the first order frequency filter to the estimated output voltage of the electrical converter.

Online, the harmonic content reference may be read from the second lookup table, for example based on a fundamental voltage reference. Furthermore, an actual, estimated filtered voltage may be determined by applying the same first order filter that was applied offline to the filtered voltage reference, to an actual, estimated voltage, which may be determined from measurements in the converter. The difference of the filtered voltage reference and the estimated filtered voltage may then be used as harmonic content error.

According to an embodiment of the invention, the fundamental voltage reference is determined from a fundamental current reference and an error provided by an external controller such as a PI controller. When the harmonic content reference and the harmonic content error are based on a filtered voltage, it may be necessary to correct the fundamental voltage reference with an external controller that determines deviations from the fundamental voltage based on the difference between the fundamental current reference and the estimated output current.

Note that the control method with a harmonic content reference based on current may not need an external controller and corresponding control loop for current control. This may be beneficial since the resulting fast control loop allows the DC link voltage to remain within stricter bounds even in the presence of grid voltage disturbances. This results in a safer and more robust operation with less trip events. It also reduces the time and complexity of commissioning because of the lesser number of tuning parameters.

According to an embodiment of the invention, the optimized pulse patterns in the first lookup table have been calculated offline with a model of the electrical converter. As already mentioned, the optimized pulse patterns may be (conventional) optimized pulse patterns, which have been calculated offline, subject to a specific optimization objective, such as minimizing losses.

According to an embodiment of the invention, the harmonic content references in the second lookup table have been calculated offline from the corresponding optimized pulse patterns applied to a model of the electrical converter. The harmonic content references may be calculated by analysing a harmonic content of the voltage and/or current produced when the corresponding optimized pulse pattern is applied to the converter. This analysis may be done by simulating the converter offline.

A further aspect of the invention relates to a controller for an electrical converter, which controller is adapted for controlling the electrical converter according to the method as described above and below.

For example, the controller may comprise a processor and a computer program, which, when being executed by the processor, performs the method. It also may be possible that the method is at least partially implemented in hardware, for example in an FPGA and/or a DSP.

The first and second lookup table may be stored in a memory of the controller.

A further aspect of the invention relates to a converter system, which comprises an electrical converter and such a controller. The electrical converter may be adapted for converting an AC voltage into a DC voltage and/or vice versa. The electrical converter may comprise semiconductor switches that are controlled by the controller for converting the voltages.

According to an embodiment of the invention, the electrical converter is an active rectifier for converting an AC input voltage into a DC output voltage. It is also possible to operate the converter in a reverse mode, in which energy from the DC link is supplied into the AC grid. For example, the electrical converter may be connected to an AC grid and may supply a DC link with its DC output voltage. The controller may measure voltages and/or currents in the electrical grid and may control the generation of the DC link voltage based on these measurements.

With the method, the current error on the grid side may be controlled based on general optimized pulse patterns by using a fast closed-loop correction mechanism of the switching instants of the optimized pulse patterns. This in turn allows using optimized pulse patterns specifically designed for specific objectives such as shaping the voltage spectrum and/or minimizing switching losses. Shaping the voltage spectrum to fit electrical grid standards may be of particular interest since the electrical converter may meet the standard's requirements without using a filter, which may reduce cost and size of the electrical converter.

Furthermore, with the described control method/controller, the converter system may be more robust to grid events such as voltage dips due to the ability of fast tracking a current reference and in turn ensuring that the voltage levels of the DC link remain within bounds.

It may be expected that the number of trips due to disturbances on the grid voltage is reduced.

Additionally, the proposed method may reduce costs of drive commissioning, since it does not require tuning of current controller parameters, which has been shown to be troublesome in a number of situations.

Also, the converter system may be cheaper to produce, since it may comply with grid standards without requiring a filter. This is possible because the proposed method drops the requirement on smoothness of the voltage reference patterns, allowing the voltage reference patterns to be computed in order to comply with grid standards and/or to fit specific needs.

It has to be understood that features of the method as described in the above and in the following may be features of the converter system and/or the controller as described in the above and in the following, as well as vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
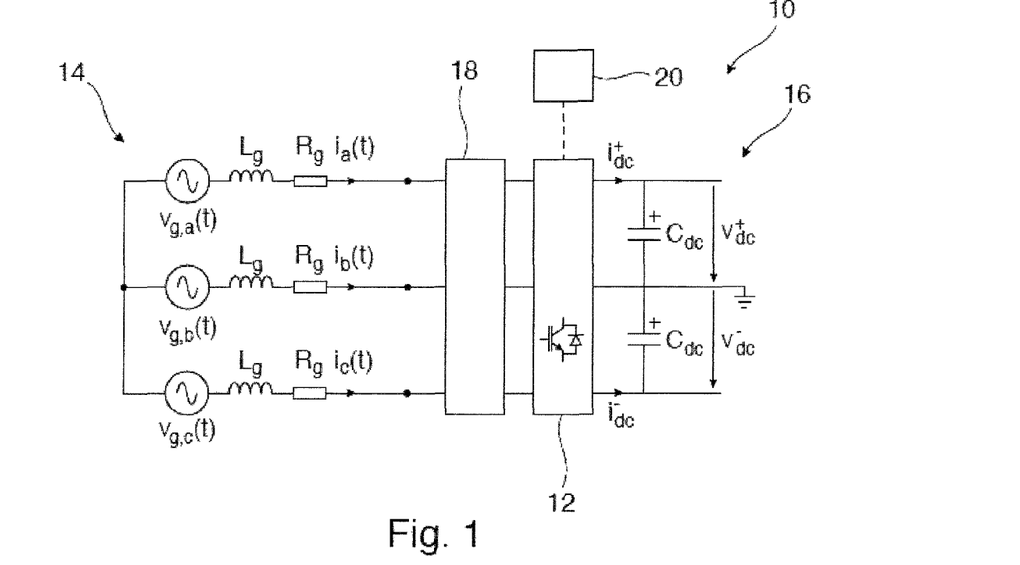
FIG. 1 schematically shows a converter system according to an embodiment of the invention.

FIG. 1 schematically shows a converter system 10 with an electrical converter 12 interconnecting an electrical grid 14 with a DC link 16. Thus, the converter system 10 may be seen as active rectifier. Three-phases of the electrical grid 14 provide an AC voltage $v_g$, which is supplied via a filter and/or transformer 18 to the converter 12, which transforms the three-phase AC voltage $v_g$ into a DC voltage supplied to the DC link 16, which, as shown in FIG. 1, may be a split DC link with a neutral point between two DC link capacitors $C_{dc}$.

FIG. 1 additionally shows some variables that will be used in the following and that are listed in the following table.

| variable | description |
|---|---|
| $v_{g,ph}$ (t), ph ∈ {a, b, c} | (estimated) grid voltage of phase ph at time t |
| $v_{ph}$ (t), ph ∈ {a, b, c} | converter voltage of phase ph at time t |
| $i_{ph}$ (t), ph ∈ {a, b, c} | grid current of phase ph at time t |
| $L = L_g + L_c$ | (estimated) total inductance seen by the converter |
| $R = R_g + R_c$ | (estimated) total resistance seen by the converter |
| $C_{dc}$ | half DC link capacitance |
| Δt | vector of time changes on the nominal switching times |
| $\bar{x}$ | reference value of variable x |
| $\tilde{x}$ | error of variable x with respect to its reference |
| x* | optimal value of x |

The converter system 10 furthermore comprises a controller 20, which controls (switches) semiconductor switches of the electrical converter 12. As described in detail below, the controller 20 is adapted for modifying optimized pulse patterns such that the fundamental component of the voltage and/or current is tracked and a harmonic content of the three-phase AC voltage (which harmonics would be generated by the electrical converter 10) is shaped according to the optimized pulse pattern.

Figure 2:
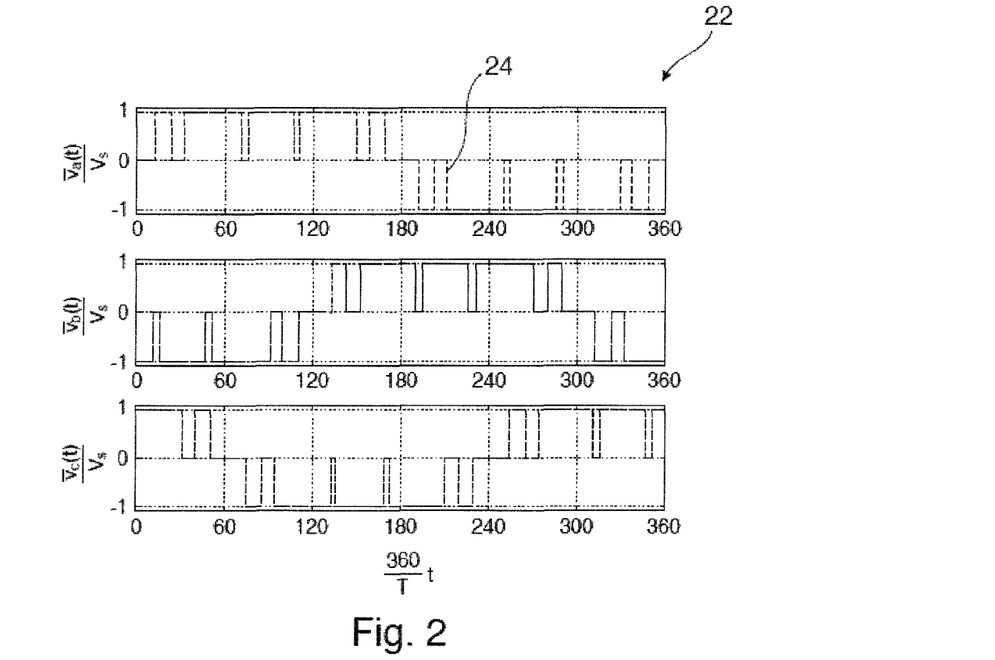
FIG. 2 shows a diagram illustrating an optimized pulse pattern.

FIG. 2 illustrates an example of an optimized pulse pattern 22. The optimized pulse pattern models a voltage level for every phase to be output by the converter 12. At switching instants 24, the voltage level of a phase has to be switched to another level. Usually, the switching instants 24 are provided as switching angles, which have to be converted to switching instants based on the period length of the actual frequency.

From the optimized pulse pattern 22, a time dependent voltage reference $\bar{v}(t)$ may be determined, which may be translated into switching commands to be applied to the converter 12.

Figure 3:
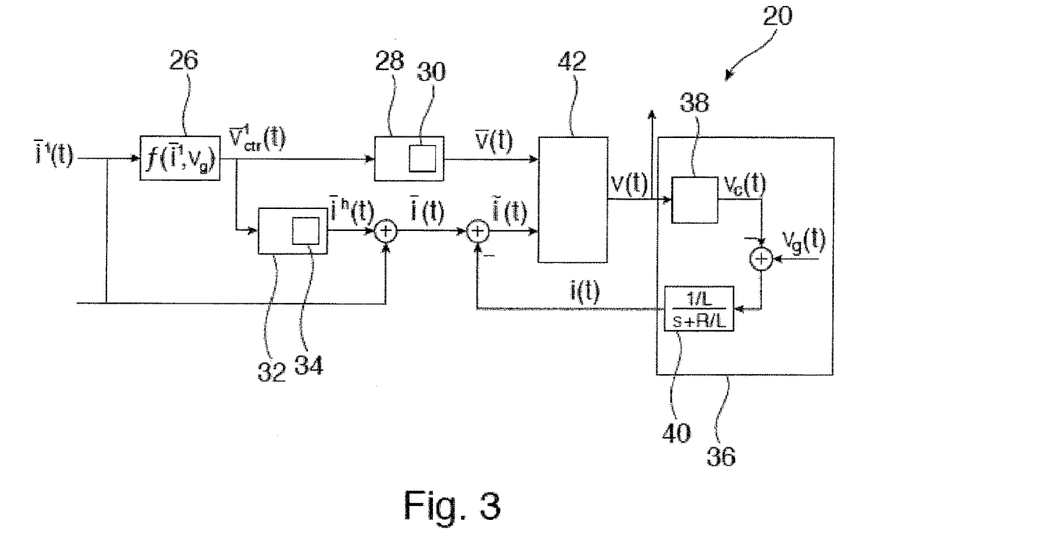
FIG. 3 schematically shows a controller according to an embodiment of the invention.

FIG. 3 shows an embodiment of the controller 20, which is based on current control. The controller 20 receives a fundamental current reference $\bar{i}^1(t)$ and provides a voltage reference/output voltage v(t) (based on a modified optimized pulse pattern 22), which may be used for determining switching states to be applied to the electrical converter 12.

In fundamental reference voltage estimation block/step 26, the controller determines a real-valued reference converter voltage $\bar{v}_{ctr}^1(t)$ from the desired fundamental current reference $\bar{i}^1(t)$ and the estimated grid voltage $v_g(t)$. For example, an external control loop may provide a reference for the desired fundamental current $\bar{i}^1(t)$.

The real-valued voltage reference $\bar{v}_{ctr}^1(t)$ may be obtained from the desired fundamental current $\bar{i}^1(t)$ and the grid voltage (estimate) $v_g(t)$ in the following way $$\bar{v}_{ctr}^1(t) = v_g(t) - R\bar{i}^1(t) - L\frac{\partial \bar{i}^1(t)}{\partial t} \quad (1)$$

where $R=R_g+R_c$ and $L=L_g+L_c$ are the total series resistance and inductance between the grid voltage source and the converter terminals. Note that it may be assumed that the grid voltage is an ideal fundamental voltage source, i.e., $v_g(t)=v_g^1(t)$.

In optimal voltage reference determination block/step 28, an optimal voltage reference $\bar{v}(t)$ is determined from the fundamental reference voltage $\bar{v}_{ctr}^1(t)$. The optimal voltage reference $\bar{v}(t)$ is based on an optimal pulse pattern 24 that is read from a first lookup table 30 stored in the controller 20.

With respect to FIG. 2, the optimized pulse patterns 22 in the table 30 may be stored in the form of switching instants/angles 24 together with their corresponding voltage levels, which were indexed by the fundamental reference voltage $\bar{v}_{ctr}^1(t)$. The optimal voltage reference $\bar{v}(t)$ then may be reconstructed from these stored values.

The optimal voltage reference $\bar{v}(t)$ or the corresponding optimized pulse pattern 22 may be computed offline to optimize a specific objective function such as Total Harmonic Distortion (THD) and/or to shape the spectral content of the voltage to fit some requirements such as grid standards. In closed-loop operation, the real-valued voltage reference $\bar{v}_{ctr}^1(t)$ may be used as an index to read in the table 30 the optimal voltage reference $\bar{v}(t)$.

In harmonic content determination block 32, a harmonic current reference $\bar{i}^h(t)$ is determined from the fundamental reference voltage $\bar{v}_{ctr}^1(t)$.

The optimal voltage reference $\bar{v}(t)$ determined from the fundamental reference voltage $\bar{v}_{ctr}^1(t)$ has discrete amplitude values, which result in higher order contributions to the converter current, when the optimal voltage reference $\bar{v}(t)$ would be directly applied to the converter 12. This harmonic content may be computed offline and may be stored in a second lookup table 34. For example, a model of the system 10 may be simulated with the optimal voltage reference $\bar{v}(t)$ and the generated currents may be analyzed.

In particular, when the optimal voltage reference $\bar{v}(t)$ is applied over a series resistor-inductor circuit, the resulting current is a low-pass filtered version of the voltage. The magnitude of the fundamental component of the resulting current may be subtracted to obtain the harmonic current reference $\bar{i}^h(t)$. This is done because the magnitude of the fundamental component of the converter current also depends on the grid voltage $v_g(t)$, which is not known a priori and therefore cannot be used to compute the offline trajectory of the harmonic current reference $\bar{i}(t)$.

The trajectory of the harmonic current reference $\bar{i}^h(t)$ may be obtained using Fourier series. Let $a_n$ and $b_n$, $n=1, 2, \ldots, \infty$ be the Fourier coefficients that describe $\bar{v}(t)$, i.e., $$\bar{v}(t) = \sum_{n=1}^{\infty} a_n \cos\left(\frac{2\pi nt}{T}\right) + b_n \sin\left(\frac{2\pi nt}{T}\right) \quad (2)$$

$$= \underbrace{a_1 \cos\left(\frac{2\pi t}{T}\right) + b_1 \sin\left(\frac{2\pi t}{T}\right)}_{\bar{v}^1(t)} + \underbrace{\sum_{n=2}^{\infty} a_n \cos\left(\frac{2\pi nt}{T}\right) + b_n \sin\left(\frac{2\pi nt}{T}\right)}_{\bar{v}^h(t)}$$

where $\bar{v}^1(t)$ and $\bar{v}^h(t)$ are the fundamental and the harmonic content of the stored optimal voltage, respectively, and T is the period of the fundamental component. Notice that in (2) the summation for the harmonic content $\bar{v}^h(t)$ starts with n=2, thus excluding the fundamental component.

The current corresponding to the harmonic content $\bar{v}^h(t)$, when applied to an RL series circuit, is given by $$\bar{i}^h(t) = \sum_{n=2}^{\infty} \tilde{a}_n \cos\left(\frac{2\pi nt}{T}\right) + \tilde{b}_n \sin\left(\frac{2\pi nt}{T}\right). \quad (3)$$

where $\tilde{a}_n$ and $\tilde{b}_n$, n=1, 2, ..., $\infty$ are the Fourier coefficients modulated through the impedance $Z_n = R + jwnL$, i.e., $$\tilde{a}_n = \text{Re}\left\{\frac{a_n}{Z_n}\right\} + j\text{Im}\left\{\frac{b_n}{Z_n}\right\} \quad (4)$$

$$\tilde{b}_n = \text{Re}\left\{\frac{b_n}{Z_n}\right\} + j\text{Im}\left\{\frac{a_n}{Z_n}\right\} \quad (5)$$

where $$j = \sqrt{-1}, w = \frac{2\pi}{T},$$

and Re(x) and Im(x) are the real and imaginary parts of x, respectively.

The trajectory of $\bar{i}^h(t)$ may be computed offline and stored in memory of the controller 20 in a lookup table 34 indexed with respect to the fundamental reference voltage $\bar{v}_{ctr}^1(t)$. In closed-loop operation, the real-valued voltage reference $\bar{v}_{ctr}^1(t)$ may be used as an index to read in the harmonic current reference $\bar{i}^h(t)$.

Figure 4:
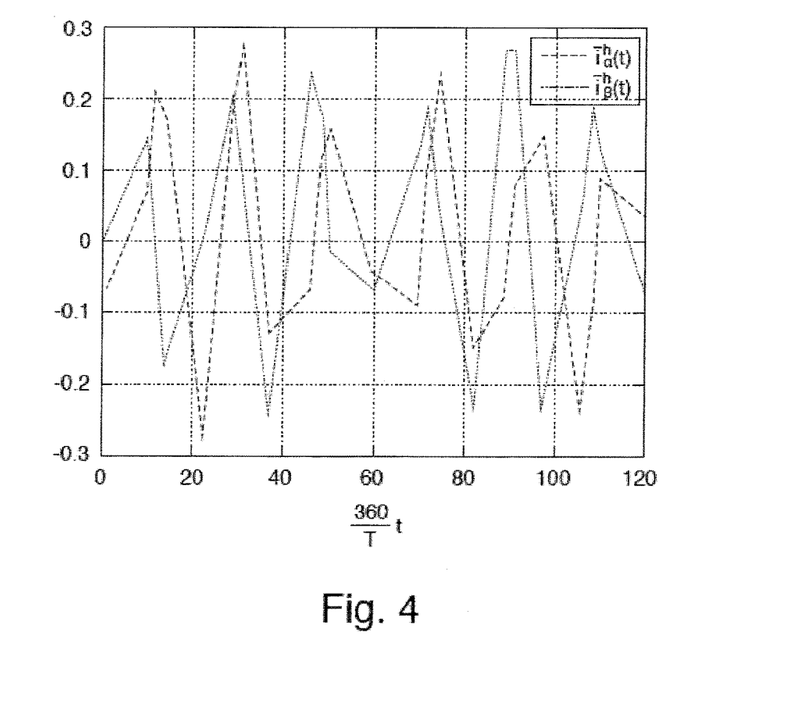
FIG. 4 shows a diagram illustrating a harmonic content reference used in the controller of FIG. 3.

FIG. 4 illustrates an example of a trajectory of a harmonic current reference $\bar{i}^h(t)$ for a specific fundamental reference voltage $\bar{v}_{ctr}^1(t)$. The harmonic current reference $\bar{i}^h(t)$ is provided in the stationary αβ-reference frame and may be stored for specific values of the time t. When reading back $\bar{i}^h(t)$, the missing values may be interpolated. It may be important to store the trajectory at least for the values of t when a switching transition occurs in $\bar{v}(t)$, i.e. at least at the switching instants 22 of the corresponding optimized pulse pattern 22. It may also be important to store the trajectory only during a fraction of a cycle and reconstruct the full trajectory exploring symmetries of the trajectory.

After block/step 32, the fundamental current reference $\bar{i}^1(t)$ is added to the harmonic current reference $\bar{i}^h(t)$ to determine an optimal current reference $\bar{i}(t)$, i.e., $$\bar{i}(t) = \bar{i}^1(t) + \bar{i}^h(t) \quad (6)$$

A harmonic content error in the form of a current error $\tilde{i}(t)$ is calculated by subtracting a measured/estimated current i(t) from the optimal current reference $\bar{i}(t)$, i.e.

$$\tilde{i}(t) = \bar{i}(t) - i(t) \quad (7)$$

The measured/estimated current i(t) may be provided from an estimation block 36 of the controller 20, which based on actual measurements in the system 10 determines the current i(t).

For example, the block 38 represents a mapping between voltage level commands based on the voltage reference v(t) and an actual voltage $v_c(t)$ on the output of the converter 12. The block 40 represents a model/modelling of a load.

The block 36, 38, 40 may not be part of the controller 20.

In modification block/step 42, the current error $\tilde{i}(t)$ is corrected by modifying the switching instants/angles 24 of the optimized pulse pattern 22 and/or the optimal current reference in order to follow the desired current. The switching instants 22 of the optimal voltage reference $\bar{v}(t)$ (or the optimized pulse pattern 22) may be slightly timeshifted (forward or backward in time t) to correct the current tracking error $\tilde{i}(t)$.

Block/step 42 may be performed in a dead beat manner. For example, timeshifts may be applied to the optimal voltage reference $\bar{v}(t)$ and the corresponding current corrections may be determined. When the current corrections at least partially equalize the current error $\tilde{i}(t)$, the up to now known determined timeshifts may be used as basis for further corrections with further timeshifts. This iterative optimization may be performed until a predefined time has run out (dead beat).

It also is possible that the modification of the optimal voltage reference $\bar{v}(t)$ and/or the optimized pulse pattern 22 is performed using the solution of a quadratic programming.

Let $\tilde{i}(t+W)$ be the measured/estimated current error at time t+W in the abc frame, W>0 be the desired prediction horizon, $N_a$, $N_b$, and $N_c$ be the number of switching transitions for each phase within the prediction horizon, and $\Delta t_{a,j}$, $\Delta t_{b,j}$, $\Delta t_{c,j}$, j=1, ..., N be the changes in the planned switching instants within the window t to t+W, i.e., $$\Delta t_{a,j} = t_{a,j}^* - t_{a,j},$$

where $t_{a,j}^*$ is the offline optimal switching time given by the OPP, and $t_{a,j}$ is the actual switching time computed by the closed-loop controller. Also, define the vector $$\Delta t = [\Delta t_{a,1} \ldots \Delta t_{a,N_a} \Delta t_{b,1} \ldots \Delta t_{b,N_b} \Delta t_{c,1} \ldots \Delta t_{c,N_c}]'. \quad (8)$$

Define the objective function J as $$J = \tilde{i}(t+W)'\tilde{i}(t+W) + \Delta t'Q\Delta t, \quad (9)$$

where Q is a positive-definite matrix that penalizes changes in the switching instants.

Note that $\tilde{i}(r+W)$ also depends on $\Delta t$, since the current error is based on the behaviour of the converter 12, i.e. the estimated current i(t), when the modified optimized pulse pattern is applied.

The optimization problem that computes the changes in the switching angles is given by $$\underset{\Delta t}{\text{minimize}} J(\Delta t) \quad (10)$$

subject to $t_{a,1} < \ldots < t_{a,N_a}$, $t_{b,1} < \ldots < t_{b,N_b}, t_{c,1} < \ldots < t_{c,N_c}$.

This quadratic problem may be solved offline and the resulting equations for the solution for Δt may be implemented in the controller 20 in block 42.

Figure 5:
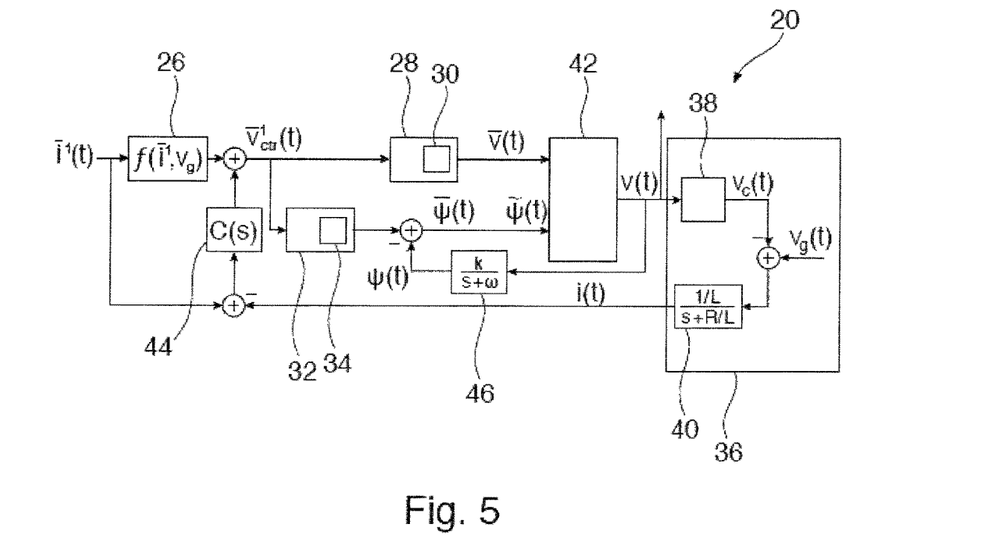
FIG. 5 schematically shows a controller according to a further embodiment of the invention.

FIG. 5 shows an embodiment of the controller 20, which is also based on current control. Analogously to the controller 20 in FIG. 3, the controller in FIG. 5 receives a fundamental current reference $\bar{i}^1(t)$ and provides a voltage reference v(t) (a modified optimized pulse pattern 22), which may be used for determining switching states to be applied to the electrical converter 12.

Contrary to the controller 20 of FIG. 3, the fundamental voltage reference $\bar{v}_{ctr}^1(t)$ is determined according to $$\bar{v}_{ctr}^1(t) = v_g(t) - R\bar{i}^1(t) - L\frac{\partial \bar{i}^1(t)}{\partial t} + C(s)(\bar{i}^1(t) - i(t)) \quad (11)$$

where the last (and additional) term feeds back the current error. The measured/estimated current i(t) is subtracted from the fundamental current reference $\bar{i}^1(t)$ and the result is input to a controller 44, such as a PI controller, to account for the current error in an outer control loop. The result of the controller is then added to the (basic) fundamental voltage reference provided by block/step 26 to determine the (corrected) fundamental voltage reference $\bar{v}_{ctr}^1(t)$.

Analogously to FIG. 3, the optimized pulse pattern 22 and the optimal voltage reference $\bar{v}(t)$ are then determined in block/step 28 from the first lookup table 30.

In FIG. 5, the harmonic content correction determination and correction in blocks 32 and 42 is based on a filtered voltage.

In particular, the harmonic content determination block/step 32 determines a harmonic content reference in the form of a filtered voltage $\bar{\psi}(t)$. The filtered voltage $\bar{\psi}(t)$ is stored in the second lookup table 34 in the controller 34.

Figure 6:
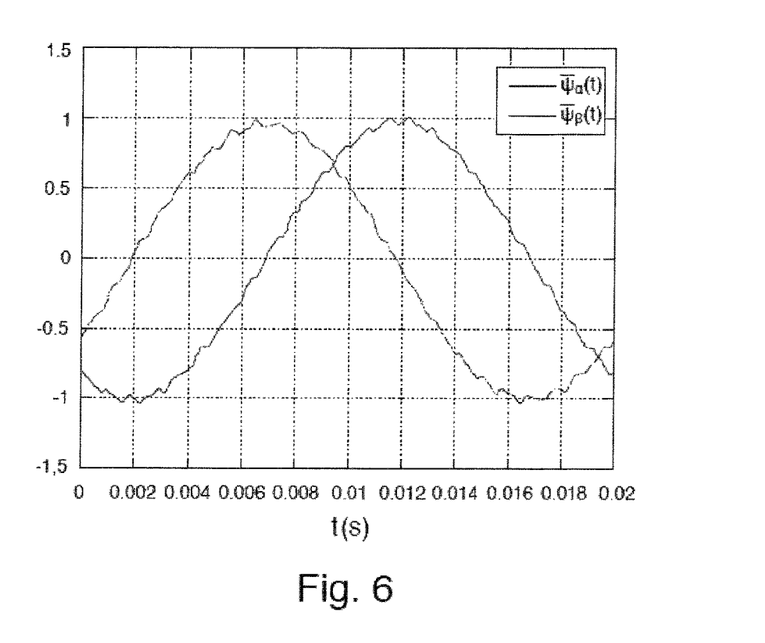
FIG. 6 shows a diagram illustrating a further harmonic content reference used in the controller of FIG. 5.

FIG. 6 illustrates an example of a trajectory of a filtered voltage $\bar{\psi}(t)$ for a specific fundamental reference voltage $\bar{v}^1(t)$. The filtered voltage $\bar{\psi}(t)$ may be provided in the stationary αβ-reference frame and may be stored for specific values of the time t. When reading back $\bar{\psi}(t)$, the missing values may be interpolated. The trajectory of the filtered voltage $\bar{\psi}(t)$ may be computed offline and stored in a memory of the controller 20 in a lookup table 34 indexed with respect to the fundamental reference voltage $\bar{v}_{ctr}^1(t)$.

For example, the filtered voltage may be computed offline using a first order filter applied to the optimal voltage reference $\bar{v}(t)$.

$$\bar{\psi}(t) = \frac{k}{s+\omega}\bar{v}(t) \quad (12)$$

Figure 7:
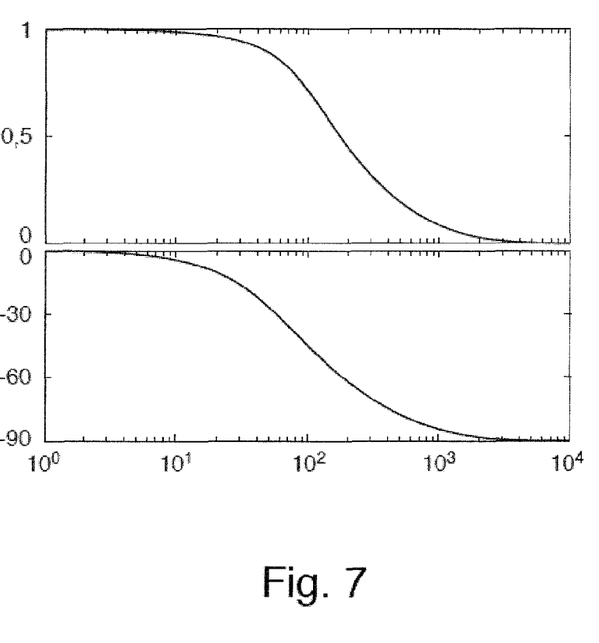
FIG. 7 shows a diagram illustrating a filter function used in the controller of FIG. 5.

FIG. 7 shows a Bode diagram for the first order filter. At low frequencies, the Bode response may be of magnitude one and almost zero phase shift, i.e. the filtered voltage $\bar{\psi}(t)$ may be interpreted as a voltage for low frequencies. At high frequencies, the Bode response may be similar to that of an integrator, i.e. the filtered voltage $\bar{\psi}(t)$ may be interpreted as a flux for high frequencies.

Returning to FIG. 5, from the filtered voltage $\bar{\psi}(t)$, a filtered voltage error $\tilde{\psi}(t)$ is calculated as harmonic content error by subtracting a measured/estimate voltage ψ(t) from the filtered voltage $\bar{\psi}(t)$. ψ(t) corresponds to the output voltage reference v(t) to which the same first order filter 46 as in (12) is applied, i.e., $$\bar{\psi}(t) = \frac{k}{s+\omega}v(t)$$

The modification block/step 42 then may correct/equalize the voltage error $\tilde{v}(t)$ by modifying the switching instants/angles 24 of the optimized pulse pattern 22 analogously to FIG. 3.

In principle, in the method of FIG. 5, the current feedback is moved to an early stage of the control loop, i.e., the reference generation part, and changes the inner loops to manipulate the error ψ(t) in the filtered voltage $\bar{\psi}(t)$.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 converter system
12 electrical converter
14 electrical grid
16 DC link
18 filter/transformer
20 controller
$v_g$ grid voltage
$L_g$ grid inductance
$R_g$ grid resistance
$i_a(t)$ grid current
$i_{DC}^+$, $i_{DC}^-$ DC link current
$v_{DC}^+$, $v_{DC}^-$ DC link voltage
$C_{dc}$ DC link capacitor
22 optimized pulse pattern
24 switching instant
26 fundamental reference voltage estimation block/step
28 optimal reference voltage determination block/step
30 lookup table
32 harmonic content determination block/step
34 lookup table
$\bar{i}^1(t)$ fundamental current reference
$\bar{v}_{ctr}^1(t)$ fundamental voltage reference
$\bar{v}(t)$ optimal voltage reference
v(t) modified optimized pulse pattern, voltage reference
$\bar{i}^h(t)$ harmonic current reference
$\bar{i}(t)$ optimal current reference
$\tilde{i}(t)$ current error
i(t) measured/estimated current
36 current estimation block/step
38 conversion block/step
40 load modelling block/step
42 modification block/step
44 controller
46 frequency filter $\bar{\psi}(t)$ filtered voltage
$\tilde{\psi}(t)$ filtered voltage error
$\psi(t)$ measured/estimated voltage

The invention claimed is:

1. A method for operating an electrical converter, the method comprising:
   determining an optimized pulse pattern ($\bar{v}(t)$) from a fundamental voltage reference ($\bar{v}_{ctr}^1(t)$) for the electrical converter, wherein the optimized pulse pattern ($\bar{v}(t)$) is determined from a first lookup table and comprises discrete voltage amplitude values changing at predefined switching instants;
   determining a harmonic content reference ($\bar{i}^h(t)$, $\bar{\psi}(t)$) from the fundamental voltage reference ($\bar{v}_{ctr}^1(t)$) based on a second lookup table, wherein the harmonic content reference is a harmonic current reference ($\bar{i}^h(t)$) determined from the frequency spectrum of a current of the electrical converter or the harmonic content reference is a filtered voltage reference ($\bar{\psi}(t)$) determined by applying a first order frequency filter to a voltage, which current or voltage is generated, when the optimized pulse pattern is applied to the electrical converter;
   determining a harmonic content error ($\tilde{i}(t)$, $\tilde{\psi}(t)$) from the harmonic content reference ($\bar{i}^h(t)$, $\bar{\psi}(t)$) by subtracting an estimated output voltage ($\psi(t)$) and/or estimated output current ($i(t)$) of the electrical converter from the harmonic content reference ($\bar{i}^h(t)$, $\bar{\psi}(t)$);
   modifying the optimized pulse pattern ($\bar{v}(t)$) by timeshifting switching instants such that the fundamental voltage reference ($\bar{v}_{ctr}^1(t)$) is tracked and the harmonic content error ($\tilde{i}(t),\tilde{\psi}(t)$) is corrected by the timeshifted switching instants;
   applying the modified optimized pulse pattern ($v(t)$) to semiconductor switches of the electrical converter.

2. The method of claim 1, wherein the harmonic content error ($\tilde{i}(t)$, $\tilde{\psi}(t)$) is corrected by minimizing a cost function, which comprises a term quadratic in the harmonic content error and/or a term quadratic in timeshifts of the switching instants.

3. The method of claim 2, wherein the timeshifts are applied in a time window ending at a prediction horizon; and/or
   wherein the cost function is based on the harmonic content error at the end of the prediction horizon.

4. The method of claim 3, wherein the cost function is minimized subject to the constraint that an order of switching instants does not change.

5. The method of claim 3, wherein the cost function is minimized by solving a quadratic programming.

6. The method of claim 3, further comprising:
   determining the fundamental voltage reference ($\bar{v}_{ctr}^1(t)$) from a fundamental current reference ($\bar{i}^1(t)$) and an estimated grid voltage ($v_g$).

7. The method of claim 3,
   wherein the harmonic content error ($\tilde{\psi}(t)$) is the difference of the filtered voltage reference ($\bar{\psi}(t)$) and an estimated filtered voltage ($\psi(t)$);
   wherein the estimated filtered voltage ($\psi(t)$) is determined by online applying the first order frequency filter to the estimated output voltage of the electrical converter.

8. The method of claim 2, wherein the cost function is minimized subject to the constraint that an order of switching instants does not change.

9. The method of claim 8, wherein the cost function is minimized by solving a quadratic programming.

10. The method of claim 2, wherein the cost function is minimized by solving a quadratic programming.

11. The method of claim 2, further comprising:
    determining the fundamental voltage reference ($\bar{v}_{ctr}^1(t)$) from a fundamental current reference ($\bar{i}^1(t)$) and an estimated grid voltage ($v_g$).

12. The method of claim 2,
    wherein the harmonic content error ($\tilde{\psi}(t)$) is the difference of the filtered voltage reference ($\bar{\psi}(t)$) and an estimated filtered voltage ($\psi(t)$);
    wherein the estimated filtered voltage ($\psi(t)$) is determined by online applying the first order frequency filter to the estimated output voltage of the electrical converter.

13. The method of claim 1, further comprising:
    determining the fundamental voltage reference ($\bar{v}_{ctr}^1(t)$) from a fundamental current reference ($\bar{i}^1(t)$) and an estimated grid voltage ($v_g$).

14. The method of claim 1,
    wherein the harmonic content error ($\tilde{\psi}(t)$) is the difference of the filtered voltage reference ($\bar{\psi}(t)$) and an estimated filtered voltage ($\psi(t)$);
    wherein the estimated filtered voltage ($\psi(t)$) is determined by online applying the first order frequency filter to the estimated output voltage of the electrical converter.

15. The method of claim 1,
    wherein the fundamental voltage reference ($\bar{v}_{ctr}^1(t)$) is determined from a fundamental current reference ($\bar{i}^1(t)$) and an error provided by an external controller.

16. The method of claim 1,
    wherein the optimized pulse patterns ($\bar{v}(t)$) in the first lookup table have been calculated offline.

17. The method of claim 1,
    wherein the harmonic content references ($\bar{i}^h(t)$, $\bar{\psi}(t)$) in the second lookup table have been calculated offline from the corresponding optimized pulse patterns applied to a model of the electrical converter.

18. A controller for an electrical converter, which controller is adapted for controlling the electrical converter, the controller operable to:
    determine an optimized pulse pattern ($\bar{v}(t)$) from a fundamental voltage reference ($\bar{v}_{ctr}^1(t)$) for the electrical converter, wherein the optimized pulse pattern ($\bar{v}(t)$) is determined from a first lookup table and comprises discrete voltage amplitude values changing at predefined switching instants;
    determine a harmonic content reference ($\bar{i}^h(t)$, $\bar{\psi}(t)$) from the fundamental voltage reference ($\bar{v}_{ctr}^1(t)$) based on a second lookup table, wherein the harmonic content reference is a harmonic current reference ($\bar{i}^h(t)$) determined from the frequency spectrum of a current of the electrical converter or the harmonic content reference is a filtered voltage reference ($\bar{\psi}(t)$) determined by applying a first order frequency filter to a voltage, which current or voltage is generated, when the optimized pulse pattern is applied to the electrical converter;
    determine a harmonic content error ($\tilde{i}(t)$, $\tilde{\psi}(t)$) from the harmonic content reference ($\bar{i}^h(t)$, $\bar{\psi}(t)$) by subtracting an estimated output voltage ($\psi(t)$) and/or estimated output current ($i(t)$) of the electrical converter from the harmonic content reference ($\bar{i}^h$, $\bar{\psi}(t)$);
    modify the optimized pulse pattern ($\bar{v}(t)$) by timeshifting switching instants such that the fundamental voltage reference ($\bar{v}_{ctr}^1(t)$) is tracked and the harmonic content error ($\tilde{i}(t)$, $\tilde{\psi}(t)$) is corrected by the timeshifted switching instants; and
    apply the modified optimized pulse pattern ($v(t)$) to semiconductor switches of the electrical converter.

19. A converter system, comprising:
an electrical converter; and
a controller according to claim 18.

20. The converter system of claim 19, wherein the converter is a voltage source converter for converting an AC input voltage into a DC output voltage.

* * * * *